United States Patent [19]

Gronskog

[11] Patent Number: 5,038,245

[45] Date of Patent: Aug. 6, 1991

[54] METHOD AND APPARATUS FOR SUPPRESSING ELECTRICAL TRANSIENTS

[76] Inventor: Lennart Gronskog, 2878 Luciernaga St., Carlsbad, Calif. 92009

[21] Appl. No.: 407,666

[22] Filed: Sep. 15, 1989

[51] Int. Cl.⁵ .............................................. H02H 9/04
[52] U.S. Cl. ........................................ 361/56; 361/58; 361/111; 361/127
[58] Field of Search ...................... 361/56, 58, 57, 111, 361/84, 91, 127

[56] References Cited

U.S. PATENT DOCUMENTS

| | | | |
|---|---|---|---|
| 4,023,071 | 5/1977 | Fussell | 361/56 |
| 4,323,942 | 4/1982 | Hartman et al. | 361/56 |
| 4,870,528 | 9/1989 | Harford | 361/56 |

Primary Examiner—Todd E. DeBoer
Attorney, Agent, or Firm—Bernard L. Kleinke; William P. Waters; Jerry R. Potts

[57] ABSTRACT

A method and apparatus for suppressing electrical transient signals, occurring on power lines, includes a clamping circuit for switching from a high impedance to a low impedance at a certain switching voltage, to suppress the transient signals. A first blocking circuit inhibits the clamping circuit from switching to maintain it at its high impedance during normal line voltage, and permits the clamping circuit to switch to its low impedance for clamping purposes responsive to an initial portion of a transient signal for initial suppression purposes. A second blocking circuit has a second low impedance, which is substantially lower than said first low impedance of the first blocking circuit, for inhibiting substantially the first blocking circuit from continuing to dissipate the transient signal following the initial time period, and for permitting the clamping circuit to suppress the transient signal following the initial time period. When coupled to a three conductor power line, unidirectional devices are employed to couple transient signals from any one of the three conductors of the power line, to the clamping circuit.

12 Claims, 3 Drawing Sheets

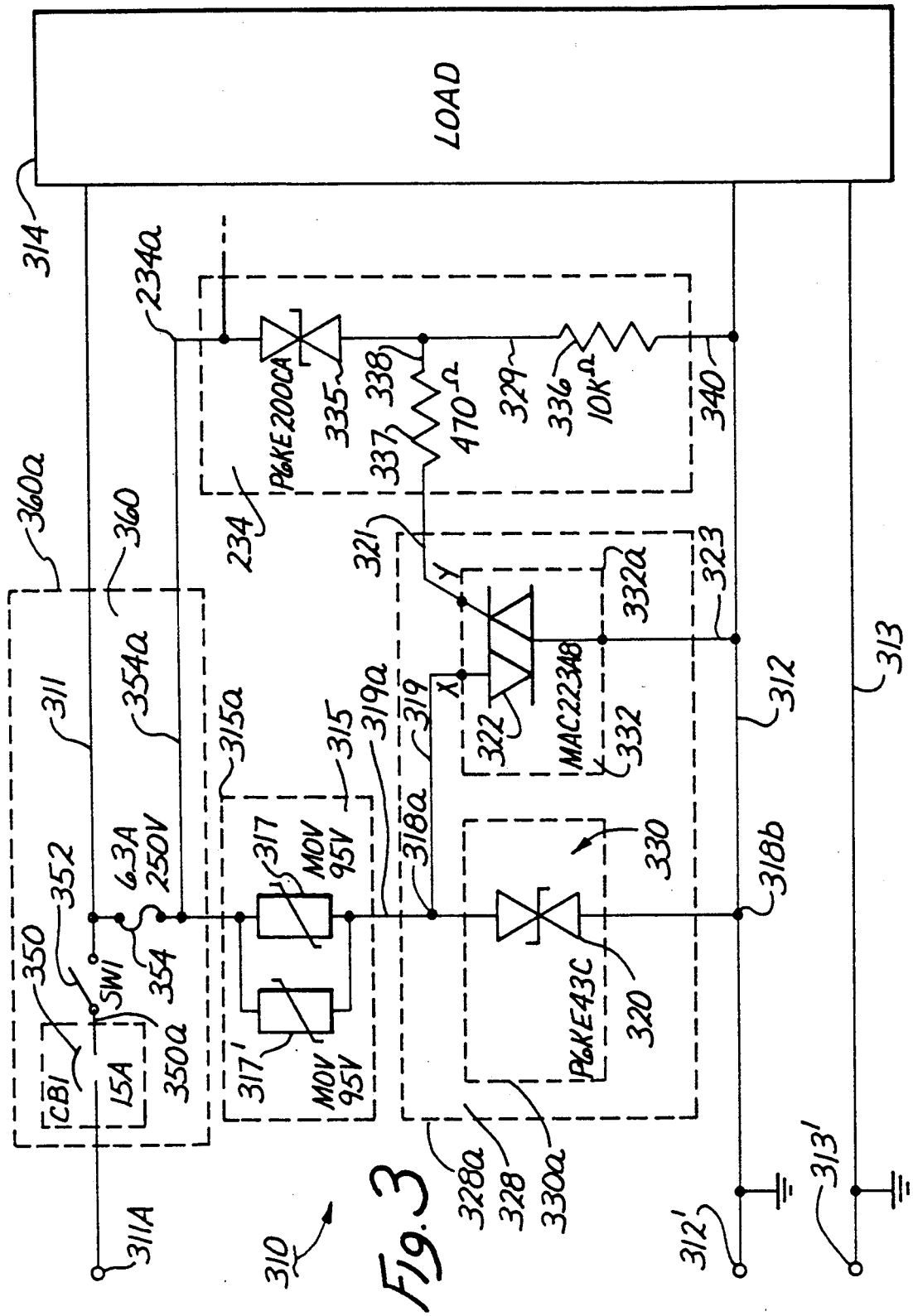

METHOD AND APPARATUS FOR SUPPRESSING ELECTRICAL TRANSIENTS

TECHNICAL FIELD

The present invention relates in general to a method and apparatus for suppressing electrical transients to prevent, or at least to reduce the possibility of disruption or even destruction of electronic circuits to be protected. More particularly, the present invention relates to a transient suppression system, forming a part of, or as used in uninterrupted power supply equipment, power directors and power strips.

BACKGROUND ART

There have been many different types and kinds of transient suppression systems and methods for suppressing high energy transient signals occurring on electrical power lines. Such transient signals are typically high voltage pulses having an extremely fast rise time. Transients can result from different conditions, such as lightening strikes and radio frequency interference. Such transient signals may reach peak voltages of as high as 20,000 peak volts, but generally do not exceed 6,000 volts.

Conventional transient signal suppressing systems used for protecting electrical equipment, such as computer and other types and kinds of electronic equipment, have been disclosed in numerous U.S. patents. For example, reference may be made to the following U.S. Pat. Nos.: 4,095,163; 4,271,446; 4,563,720; 4,571,656; 4,587,588; 4,630,163; 4,698,721; and 4,760,485. Such patented systems have heretofore included various types of filters, isolation transformers, and high energy transient suppression devices, such as metal oxide varistors, gas tubes, and silicon avalanche suppressors.

While such prior known methods and systems may have been successful for some applications, it has been difficult, if not impossible for such systems or devices to suppress the transients to a sufficiently low level, to provide an improved form of protection for valuable electrical equipment. Additionally, such a new and improved transient suppression system should respond quickly to suppress the fast rising high energy transients effectively. In this regard, conventional suppression systems can clamp the spurious transient signals to about 500 or 600 only. Such a voltage level is unsafe for some applications.

Therefore, it would be highly desirable to have a new and improved method and apparatus for suppressing transients in a more effective manner. In this regard, it would be highly desirable to suppress them to a safer and substantially lower lever, than heretofore possible. Moreover, the fast rising transients must be responded to, instantly, in an improved manner.

Another problem associated with the prior art is that several duplicative or redundant transient suppressing devices have been required to suppress transients for each of the respective conductors in a conventional three power line conducting system having a hot, neutral and ground wire. Such duplication of clamping elements makes the manufacturing of the system more expensive. With the use of duplicated or redundant elements, such an arrangement is more complex in its operation and use.

Therefore, it would be highly desirable to have a transient suppressing system, which is capable of clamping transient signals on any one of the conductor lines in a simplified manner, and yet be able to suppress effectively the transients to a safer lower level within a fast response time.

DISCLOSURE OF INVENTION

Therefore, it is the principal object of the present invention to provide such a new and improved method and apparatus for suppressing transients suppression system that can effectively dissipate the energy of a transient signal and clamp the transient line to a safer level, within a fast response time.

Another object of the present invention is to provide such a new and improved transient voltage suppression system, which is able to suppress transients on three conductor lines in a simplified manner.

Briefly, the above and further objects of the present invention are realized by providing a new and improved method and apparatus for suppressing transients, to a substantially safer level, and in a relatively fast response time. Thus, a much improved transient suppression system is achieved in accordance with the present invention.

A method and apparatus for suppressing electrical transient signals, occurring on power lines, includes a clamping circuit for switching from a high impedance to a low impedance at a certain switching voltage, to suppress the transient signals. A first blocking circuit inhibits the clamping circuit from switching to maintain it at its high impedance during normal line voltage, and permits the clamping circuit to switch to its low impedance for clamping purposes responsive to an initial portion of a transient signal for initial suppression purposes. A second blocking circuit has a second low impedance, which is substantially lower than said first low impedance of the first blocking circuit, for inhibiting substantially the first blocking circuit from continuing to dissipate the transient signal following the initial time period, and for permitting the clamping circuit to suppress the transient signal following the initial time period When coupled to a three conductor power line, unidirectional devices are employed to couple transient signals from any one of the three conductors of the power line, to the clamping circuit.

By employing a pair of blocking circuits, the first blocking circuit permits the initial fast rising portion of the transient to be dissipated at a low impedance, in a rapid response manner. The second blocking circuit protects the first higher impedance blocking circuit, by continuing to permit the clamping circuit to dissipate the transient signal, at an even lower impedance, following the initial portion of the transient.

The overall result of the inventive method and apparatus is to suppress a high voltage transient, such as a 6,000 volt signal, to a low level, such as about 400 volts. Such a rate of suppression has not been heretofore realizable by conventional suppression systems, and in such a rapid and effective manner, with a system which is relatively inexpensive to manufacture.

Thus, by employing the unidirection device arrangement, unlike the prior known systems, there is no need for duplicative clamping units for each of the conductor power lines. Instead, in accordance with the present invention, a common clamping unit is utilized which dissipates transient signals on any one of the power line conductors.

BRIEF DESCRIPTION OF DRAWINGS

The above mentioned and other objects and features of this invention and the manner of attaining them will become apparent, and the invention itself will be best understood by reference to the following description of the embodiments of the invention in conjunction with the accompanying drawings, wherein:

FIG. 3 is a schematic diagram of still another transient suppression system which is also constructed in accordance with the present invention.

BEST MODE FOR CARRYING OUT THE INVENTION

Figure 1:
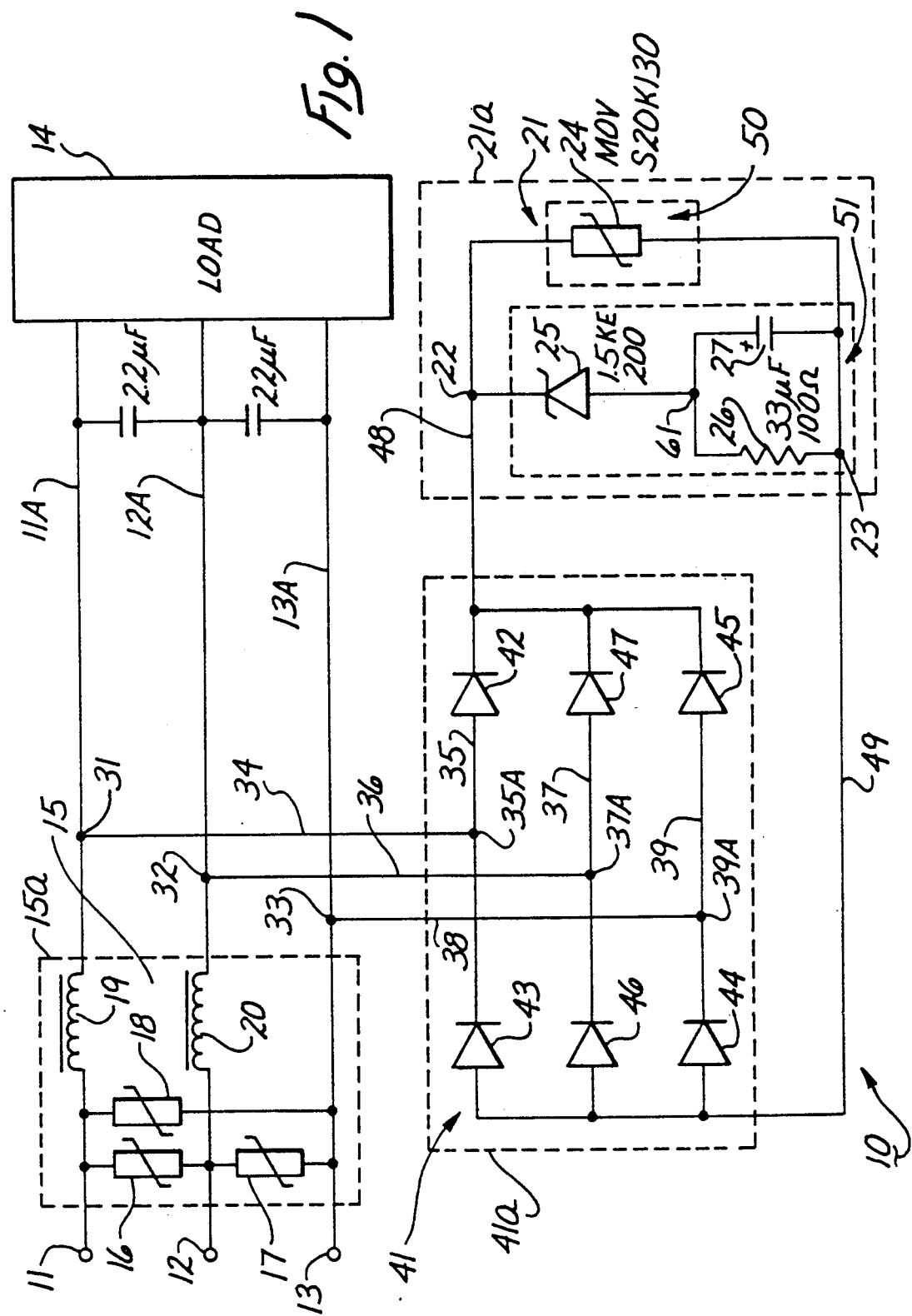
FIG. 1. is a schematic diagram of a transient suppression system which is constructed in accordance with the present invention, and which responds to transients to any one of three power line conductors.

Referring now to the drawings, and more particularly to FIG. 1 thereof there is illustrated a high energy transient suppression system 10, which is constructed according to the present invention. The system 10 comprises a common clamping unit or circuit 21, for suppressing or dissipating spurious transient signals on a conventional three conductor power line (not shown), and a coupling network or circuit 41, which supplies individually transients from the three conductors of the power line, to the unit 21.

A load 14 receives power from the power line via a conventional suppressing-filter network 15 enclosed within dotted line 15a.

A set of conductors 11A, 11B and 11C interconnect the output of the network 15 and the load 14. A set of input terminals 11, 12 and 13, are adapted to be coupled electrically to a positive or hot conductor, a neutral conductor, and a ground conductor, of a conventional three conductor power line arrangement (not shown).

The conventional suppressing filter network 15 includes a first metal oxide varistor 16 connected between terminals 11 and 12, and a second metal oxide varistor 17 connected between terminals 12 and 13. A third metal oxide varistor 18 is connected between the terminal 11 and the ground terminal 13. The suppressing filter network 15 also includes a first inductor 19 connected between terminal 11 and the hot conductor 11A. A second inductor 20 is connected between the neutral terminal 12 and the neutral conductor 12A. The suppressing filter network 15 helps suppress lower voltage transient signals in a conventional manner.

Considering now the high energy suppression system 10 in greater detail the clamping unit 21 is responsive to transient signals received on any one of the line terminals 11, 12 or 13 and is able to dissipate them, as hereinafter described in greater detail. Whenever a high energy transient signal is received on any one of the input terminals 11, 12 and 13, and is not suppressed sufficiently by the conventional suppression network 15, the transient signal is coupled via the coupling network 41 to the common clamping unit 21 for suppression purposes.

Considering now the common clamping unit 21 in greater detail with reference to FIG. 1, the common clamping unit 21 generally comprises a pair of surge suppression networks or circuits generally indicated at 50 and 51. The surge suppression network 50 includes a metal oxide varistor 24 connected between a point 22 and a point 23, which, in turn, are connected across to the coupling circuit 41 via a pair of respective leads 48 and 49. The metal oxide varistor 24 is rated at 130v and is a conventional varistor, such as the one manufactured by Simens under part No. S20K130. It will be appreciated, however, that other suitable varistors or other comparable high-energy suppression devices or circuits could be used.

The surge suppression network 51 is connected across the points 22 and 23, and includes a zener diode 25, such as the one manufactured by General Semiconductor Industries under part No. 1.5 KE 200. The network 51 includes a suitably poled zener diode 25, connected between a point 22 and the point 61, which, in turn, is connected through parallel connected circuit of a resistor 26 and a capacitor 27, to the point 49. In the preferred form of the invention, the resistor 26 is a one half watt, 100 ohm resistor, and the capacitor 27 is a 100 volt, 33 microfarad capacitor.

In operation, during normal line voltages, the common clamping unit 21 is non-conductive and thus, is substantially an open circuit, so that little or no load current flows through the high energy suppressor system 10. During the presence of high energy transient signals flowing unattenuated through the network 15, the common clamping unit 21 is able to suppress both positive and negative such transient signals. In this regard, for example, assume a positive transient signal is received at the positive terminal 22, either one or both of the surge suppression networks 50 and 51, will suppress the transient. In the case of a very fast, high energy transient, the suppression network 51 reacts quickly to begin dissipating the unwanted fast rising transient signal. In this regard, the response time of the zener diode 25 is as fast or, faster than the metal oxide varistor 24. In this regard, the diode 25 is rendered conductive, and the capacitor 27 begins to be charged by the transient signal. Thus, when the forward breakdown voltage of the zener diode 25 is exceeded by the transient signals, the zener diode 25 starts conducting, to permit capacitor 27 to start charging immediately to help suppress the transient signal.

Thereafter, as soon as the voltage across the varistor 24 exceeds its voltage breakdown level, it conducts to provide additional suppression, by helping clamp the transient signal from one lead of the network 15 through the circuits 50 and 51 to the neutral and ground terminals 12 and 13 respectively. The combination of the two suppression networks 50 and 51 effectively clamp and suppress any transient signal to a relatively safe level, so that the transient signal becomes sufficiently dissipated, to prevent or at least to reduce the possibility of damage to the electronic components in the electrical load 14.

Conversely, when a negative transient signal is received via the negative point 23, either one or both of the surge suppression networks 50 and 51 suppress the negative transient. In this case, the suppression network 51 reacts initially when the reverse breakdown voltage of the diode 25 is exceeded by the transient signal. When the diode 25 starts conducting, the capacitor 27 immediately starts charging to help suppress the initial fast rising portion of the transient signal. After this initial portion of the negative transient, additional suppression is provided by the metal oxide varistor 24 when its reverse breakdown voltage is exceeded.

During normal operation, when no high energy transients are present, the varistor 24 and the diode 25 are rendered substantially non-conductive. As a result, the capacitor 27 is not charged. However, in the presence of either a positive or negative high energy transient signal, the diode 25 permits the capacitor 27 to be charged during the initial portion of the surge, and the varistor 24 eventually is rendered conductive and causes the remaining portion of the suppression to take place. Thereafter, once the transient is suppressed, the charge on the capacitor 27 is discharged through the current limiting resistor 26, for the purpose of enabling the capacitor 27 to be discharged and become ready for any subsequent transient signals.

It will become apparent to those skilled in the art that it is desirable to have both the capacitor for absorbing the initial portion of the transient, as well as the varistor 24, since a sufficiently high energy transient could conceivably cause the large capacitor 27 to become fully charged. Thus, the varistor 24 facilitates the continued dissipation of such a larger transient.

From the foregoing examples, it can be appreciated that the common clamping unit 21 of the present invention, provides highly effective protection against both positive and negative transients received on any one of the input terminals 11, 12 and 13.

Considering now the coupling network 41 in greater detail, the coupling network 41 consists of a set of six unidirectional conducting diodes 42-47, which are arranged to define a positive transient path and a negative transient path via the common clamping unit 21. In this regard, it should be understood that during normal line voltage operations, the common clamping unit 21 does not conduct current. Thus, it functions as an open circuit. Alternately, when a transient signal exceeds the respective breakdown voltages of the clamping unit suppression networks 50 and 51, the clamping unit 21 becomes conductive, thereby clamping the unwanted original.

The coupling network 41 has the cathodes of the three diodes 42, 45 and 47 connected together through the connector 48 to the terminal 22. Similarly, the anodes of the diodes 43, 44 and 46 are connected together to the conductor 49. The cathodes of the diodes 43, 46 and 44 are connected respectively through the conductors 35, 37 and 39 to the anodes of the respective diodes 42, 47 and 45. The points 35A, 37A and 39A of the respective conductors 35, 37 and 39, are connected via the respective conductors 34, 36 and 38 to the respective points 31, 32 and 33.

Considering now the positive transient path in greater detail, the positive transient path includes two segments which are separated by the common clamping unit 21. The first segment is a path from the hot terminal 11, through the network 15 to a point 31, through the diode 42 to the positive point 22 of the clamping unit 21. The first segment includes a conductor 34 connected between the point 31 and a point 35A on a common hot line conductor 35 between the diodes 42 and 43. The diode 42 is connected between the common hot line conductor 35 and a common transient conductor 48, which, in turn, is connected to the positive point 22 of the clamping unit 21.

The second segment of the positive transient path includes a path includes the clamping circuit 21, the negative terminal 23 thereof, the conductor 49, the three commonly connected diodes 46 and 44, a pair of conductors 36 and 38 connected between points 37A and 39A of respective conductor 37 and 39, points 32 and 33 of respective conductors 12A and 13A, through the network 15 to the respective neutral and ground input terminals 12 and 13.

Considering now the negative transient path in greater detail, the negative transient path also includes two segments which extend between the network 15 and the common clamping unit 21. The first segment is a path from the hot input terminal 11, the network 15, the point 31, the conductor 34, the point 35A, the diode 43, the conductor 49, to the negative terminal 23 of the clamping unit 21.

The second segment of the negative transient path is a path from the positive terminal 22 of the common clamping unit 21, the commonly connected diodes 45 and 47, the respective points 39A and 37A, the respective conductors 38 and 36, the respective points 33 and 32, the network 15, to the respective ground and neutral input terminals 13 and 12.

Similarly, there are pairs of positive and negative segments corresponding to each one of the other to neutral and ground input terminals 12 and 13, relative to the common clamping unit 21 via the coupling network 41. In this manner, a transient appearing at any one of the three input terminals 11, 12 and 13 are connected through the network, the appropriate diodes of the clamping network 41, through the clamping unit 21, and back to either the neutral or ground input terminals 12 and 13, respectively.

Therefore, the system 10, according to the invention, can suppress unwanted transient signals of 6,000 volts, or more, to a much safer level of about 300 volts or even less. Under actual test conditions, a 6,000 volt transient signal was suppressed to about 230 volts. The transient signals are responded to instantly, and can be either positive or negative. The spurious transient signals can occur from a variety of reasons, including lightening strikes and radio frequency interference, and can be present on any one of the three conductors. The system 10 effectively suppresses them to safer levels, regardless of where or how they emanate.

Figure 2:
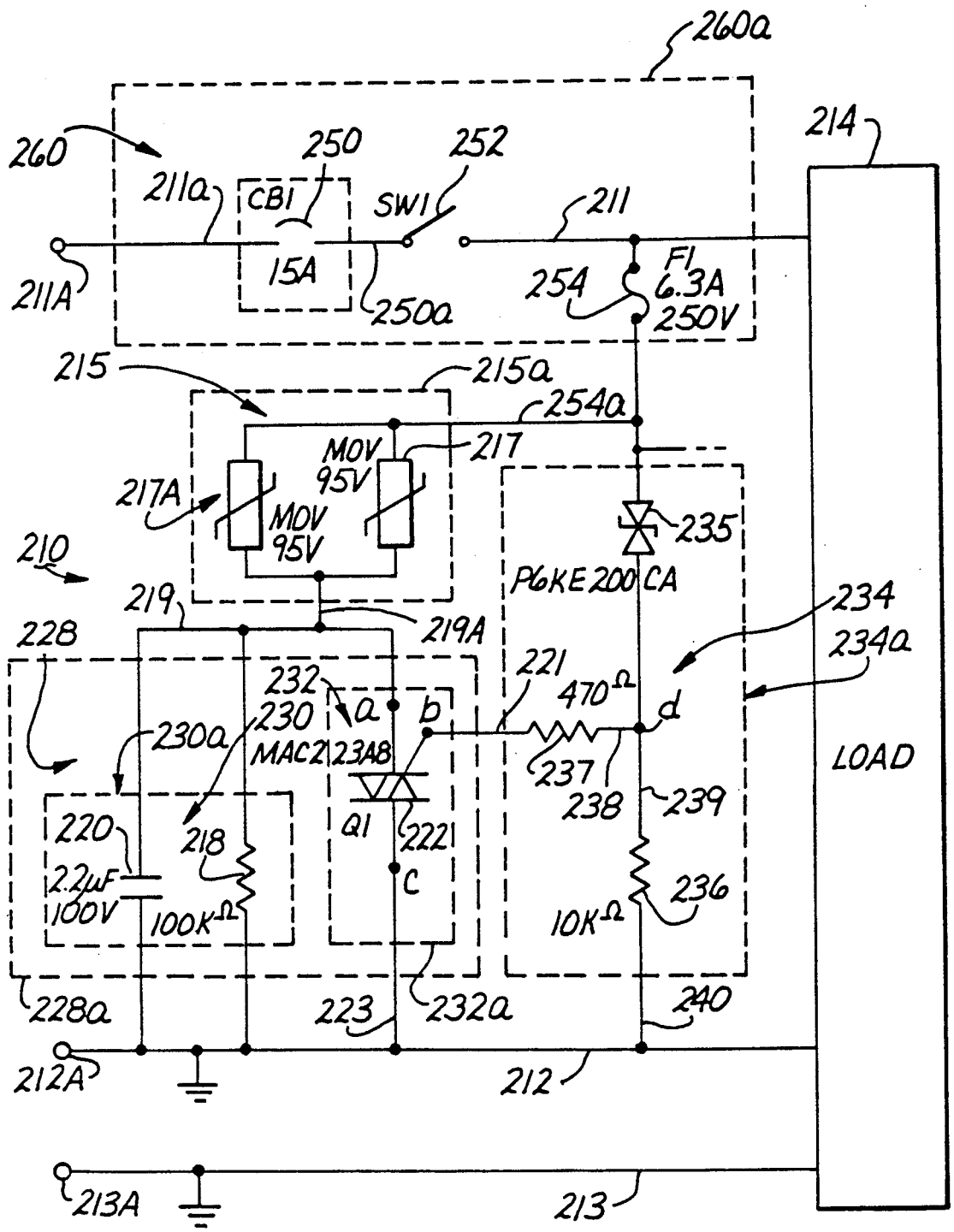
FIG. 2 is a schematic diagram of another transient suppression system, which is also constructed in accordance with the present invention.

Referring now to FIG. 2, there is shown a high energy suppression system 210, which is also constructed according to the present invention, and which is similar in function as the system 10 of FIG. 1. The system 210 is shown coupled between a hot line input terminal 211A and a neutral line input terminal 212A. The input terminals 211A and 212A, together with a ground input terminal 213A, can be connected electrically respectively to the hot, neutral and ground conductors (not shown) of a conventional 110 volt alternating current, three conductor power system (not shown). A load 214 is powered electrically via the input terminals 211A, 212A and 213A, and the suppression system 210 dissipates high energy unwanted transient signals received at the input terminals, in a similar manner as the system 10.

Other conventional suppression and filtering circuits (not shown) may be employed, in a similar manner as the network 15 of FIG. 1.

The transient suppressor 210 generally comprises a clamping circuit 215 enclosed within broken lines 215a, connected in series with a suppressor circuit 228, as indicated by broken lines 228a. The suppressor circuit 228 cooperates with the clamping circuit 215 to suppress high voltage transients, in a manner similar to the suppression system 10 of FIG. 1.

A conductor 254a connects the clamping circuit 215, through a fuse 254 to a conductor 211, which is connected to a hot or positive input to the load 214, and which is connected through a switch 252 and a circuit breaker 250 to the positive or hot input terminal 211A. The fuse 254, the switch 252 and the circuit breaker 250, form a power protection circuit or arrangement 260, as indicated by the broken lines 260a.

The power line neutral input terminal 212A is connected via a neutral conductor 212 to the load 214. The power line ground input terminal 213A is connected by a conductor 213 to the load 214, so that a three conductor alternating current power line arrangement (not shown) can be connected to the input terminals 211A, 212A and 213A for supplying power to the load 214, which may be an electrical equipment, such as a computer.

Considering now the transient suppressor 210 in greater detail, in order to clamp a spurious transient signal appearing at the power line input terminal 211A, the suppressor 210 includes a pair of parallel connected metal oxide varistors 217 and 217A, connected between the conductor 254a and a conductor 219A, which, in turn, is connected to the suppressor circuit 228. For the purpose of helping dissipate the initial portion of the fast rising transient, a capacitor 220 is connected between the conductor 219A and the neutral power line input terminal 212A, in a similar manner as the capacitor 27 of FIG. 1 operates. A parallel connected discharge resistor 218 functions in a similar manner as the resistor 26 of FIG. 1.

The metal oxide varistors 217 and 217A each switch at a voltage, such as 95 volts, slightly below the power line voltage. However, only a small insignificant current flow results during normal operation.

When a high voltage transient occurs at the hot input terminal, the varistors 217 and 217A are driven further into conduction to provide a charging path for the capacitor 220. The varistors are connected in parallel to reduce their overall effective voltage drop, and help dissipate the fast rising voltage transient.

Before the capacitor 220 becomes fully charged, a triac 222 conducts in parallel with the capacitor 220 to, in turn, take over the dissipation of the transient signal, following its initial fast rising portion thereof. In this regard, the triac 222 starts conducts at about 200 volts, in about one microsecond. The overall voltage drop across the triac 222 is substantially below the voltage drop across the parallel combination of the discharge resistor 218 and the capacitor 220. In this manner, the capacitor 220 is protected from the high energy transient signal.

Additionally, according to the present invention, the very low voltage drop across the triac 222 enables the high voltage transient signal to be dissipated to a low voltage level of about 300 volts or less. The use of the capacitor 220, together with the fast switching rate of the varistors 217 and 217A, enables the initial fast rising portion of the transient signal to be suppressed, until the triac 222 is driven sufficiently into conduction.

Thus, the suppressor 210 dissipates high energy transients to a much lower level than conventional suppressing arrangements, and also responds instantly to the very fast rising transients.

In order to trigger the triac 222, a trigger circuit 234 indicated at 234a, includes a TRANZORB device 235, which is connected at one of its ends through the fuse 254 to the hot conductor 211, and is connected at its other end through a current limiting resistor 237 to the gate of the triac 222. A current limiting biasing resistor 240 is connected between the neutral conductor 212 and a point d between the device 235 and the resistor 237. In this manner, the device 235 conducts rapidly in response to the transient signal at the input terminal 211A, and, in turn, causes the triac 222 to be biased into conduction. The device 235 switches at a voltage, such as 200 volts, substantially above the line voltage, to prevent the triac 222 from becoming conductive from the line voltage, during normal operation of the arrangement.

The suppressor circuit 228 includes the high voltage suppressor network 230 as indicated at 230a comprising the capacitor 220 and resistor 218. The high voltage suppressor network 230 is connected in parallel with a switching circuit 232 enclosed within broken lines 232a, comprising the triac 222. The high voltage suppressor network 230 helps suppress the initial portion of the transient signal to an initial clamping voltage, as soon as the clamping circuit 215 begins conducting current in response to the transient signal. Thus, clamping circuit 215 comprising the pair of varistors 217 and 217A, the high voltage suppressor network 230, cooperate with one another to help suppress and clamp the transient received on conductor 211.

The switching circuit 232 is activated by the trigger circuit 234 enclosed within the broken lines 234a. The trigger circuit 234 is coupled between the hot line terminal 211A and the neutral line terminal 212A. In this regard, when trigger circuit 234 responds to a high voltage transient signal, the circuit 234 generates an output signal that is applied to switching circuit 232, thereby enabling the switching circuit 232 to conduct, after a predetermined period of time. Switching circuit 232 also includes three terminals a, b and c. Terminal a is connected to the suppressor circuit 230 and the clamping circuit 215 via line 219, terminal b is connected to the trigger circuit 234 via line 221, and terminal c is connected to the neutral line terminal 212A via line 223.

Considering now the operation of the transient suppressor 210, as a transient signal voltage is initially applied across the clamping circuit 215, the voltage increases to a predetermined level which permits clamping circuit 215 to be driven into conduction. When circuit 215 commences conducting current, it effectively limits or clamps the transient voltage to a voltage level of 300 volts or less. The suppressor circuit 228, being connected in series with the clamping circuit 215, also responds to the transient signal and operates in cooperation with the clamping circuit 215 to clamp the voltage to a lower voltage level. In this regard, when the clamping circuit 215 responds to the transient signal, it helps clamp the transient voltage and begins conducting current to the high voltage suppressor circuit 230. Switching circuit 232 however remains non-conductive, until the trigger circuit 234 supplies an enablement signal via line 221 to the gate of the triac 222.

When trigger circuit 234 supplies the enable signal, switching circuit 232 begins conducting current. In this regard, after switching, the impedance level of the switching circuit 232 is substantially lower than the impedance level of the suppression network 230. Accordingly, the switching circuit 232 serves as an open circuit during the initial portion of a transient surge, and then following the initial transient surge, switches to a low impedance to bypass effectively the high energy suppression network 230. When the transient signal has been dissipated sufficiently, the switching circuit 232 turns off.

In this unique and novel two stage triggering arrangement, the high voltage suppressor circuit 230 is first charged to take the initial transient voltage surge by cooperating with the clamping circuit 215. This cooperative arrangement permits the clamping circuit 215 to have a voltage rating of 95 volts which is substantially below the conventional line voltage, such as 120 volts. More particularly by having a lower rating that the line voltage, the clamping circuit 215 is able to clamp more effectively the transient voltage to an overall voltage level of approximately 300 volts or less, thereby reducing the possibility of unwanted damage to the load 214, by the transient signal.

Considering now the high energy suppressor circuit 215 in greater detail, as the voltage across varistors increases to a predetermined level, the varistors breaks down or becomes conductive, and current is conducted through the varistors to limit or clamp the voltage typically to limit or clamp the voltage typically in the range of 300 to 400 volts. In one presently preferred form of the invention, the metal-oxide varistors 217 and 217A are each a MDCZ 13120UL/130V, which has a reverse bias voltage of 130 volts. It will be appreciated that other suitable varistors or other comparable high energy suppression devices or circuits may also be used.

Considering now the high voltage suppressor circuit 230 in greater detail, the high voltage suppressor circuit 230 generally comprises a parallel R-C network including the resistor 218 and the capacitor 220. In the presently preferred form of the invention, the resistor 218 may be a 100 K, one quarter watt, 5% resistor, and the capacitor 220 may be a 2.2 microfarad, 100 volt AC capacitor.

Considering now switching circuit 232 in greater detail the switching circuit 232 consists of the triac 222 coupled to the trigger circuit 234. In one presently preferred form of the invention, the triac 222 is a MAC223AB. It will be appreciated that other suitable triac devices or equivalent devices may also be employed.

The triac 222, in conjunction with the high voltage suppressor circuit 230 and the trigger or actuating circuit 234, effectively clamp the transient signal. In this regard, the triac 222 is rendered conductive at approximately 200 volts in one microsecond. The triac 222 includes terminals a, b, and c which are connected to the clamping 215, the trigger circuit 234, and the neutral line terminal 212 respectively.

Considering now the trigger circuit 234 in greater detail, the trigger circuit 234 generally comprises the silicon avalanche suppressor TRANZORB device 235, of which one typical example is marketed by General Semiconductor Industries, Inc. under the tradename TRANZORB, with a part number P6KE200CA. The silicon avalanche suppressor device 235 is a semiconductor device, which breaks down and conducts current when the voltage cross the device reaches a predetermined level. In this regard, the device 235 has a very fast response time, typically less than one nanosecond.

In the presently preferred form of the invention, the resistor 236 may be a 10 K ohm, rated at one quarter watt, 5% resistor, and resistor 237 may be a 470 ohm, rated at 0.25 watt, 5% resistor.

The device 235 has a high speed response, and responds to high voltage transients somewhat faster than the clamping circuit 215. Therefore, whenever a high voltage transient signal is encountered on the hot line 211, the device 235 starts conducting current to produce an output voltage at node or point d. As current flows through the resistor 237, the enablement signal is applied to the gate at terminal b of triac 222. When the triac 222 conducts, it switches from a high impedance condition to a low impedance condition to start conducting current.

The low impedance level of the triac 222 is substantially lower than the impedance level of the suppressor circuit 230, and since the suppressor circuit 230 and the triac 222 are connected in parallel, the triac 222 effectively bypasses the suppressor circuit 230 to prevent the capacitor 220 from being damaged by the transient signal. It should be understood that the clamping circuit 215 continues to clamp the transient signal, so long as the transient signal is present on the hot line 211.

FIG. 3 illustrates another high energy suppression system 310, which is also constructed according to the present invention. The transient suppression system 310 is similar to the system 210, except that the system 310 employs a high voltage suppressor 330, as indicated at 330a, which is different from high voltage suppressor 230 of the system 210.

The high voltage suppressor 330 consists of a TRANZORB device 320, in place of the resistor-capacitor arrangement of FIG. 2. In this regard, the TRANZORB device 320 is relatively less expensive as compared to the large capacitor used in the resistor-capacitor network of FIG. 2. In response to a fast rising transient signal, the transient suppressor 310 generally comprises a clamping circuit 315, as indicated by broken lines 315a, which is similar to the clamping circuit of FIG. 1. The clamping circuit 315 is connected in series with a suppressor circuit 328, as indicated by the broken lines 328a. The suppressor circuit 328 cooperates with the clamping circuit 315, to suppress high energy transient signals, in a manner similar to the system 210.

The suppressor circuit 328 includes the high voltage suppressor device 330 connected in parallel with a switching circuit 332 enclosed within broken lines 332a. The high voltage suppressor device 330 cooperates with the clamping circuit 315 to help dissipate the high voltage, short duration transients that are clamped by the high energy suppressor circuit 315. In this regard, the TRANZORB suppressor device 330 cooperates to further clamp the transient signals to a lower level voltage.

The suppressor circuit 328 also includes the switching circuit 332. Switching circuit 332 is activated by a trigger circuit 334 enclosed within broken lines 334a in a similar manner as the switching circuit 234 of FIG. 2. The trigger circuit 334 is coupled between the hot line conductor 311 and the neutral line conductor 312. In this regard, when trigger circuit 334 responds to a high voltage transient signal, the circuit 334 generates an output signal, which, in turn, is supplied to the switch circuit 332, thereby enabling the switch circuit 332 to conduct after a predetermined period of time.

Switching circuit 332 operates in a substantially similar manner as the switch circuit 232. The circuit includes three terminals x, y and z. Terminal x is connected to the high voltage suppressor circuit 330 and the high energy suppressor circuit 315 via line 319; terminal y is connected to the trigger circuit 334 via line 321, and terminal z is connected to the neutral line terminal via line 323. As all the circuit elements of transient suppressor 310 are otherwise similar to the circuit elements of transient suppressor 210, only the high voltage suppressor device 330 will now be described hereinafter in greater detail.

Considering now the high voltage suppressor device 330 in greater detail, the high voltage suppressor device 330 generally comprises the silicon avalanche suppressor TRANZORB device 320 of which one typical example is manufactured by General Semiconductor Industries, Inc. under the tradename TRANZORB. The silicon avalanche suppressor 320 operates in a manner similar to device 235 in that it has a very fast response time, typically less than one nanosecond. In the preferred form of the invention, the silicon avalanche suppressor device 320 is manufactured by General Semiconductor Industries, Inc., and is identified as part No. P6KE43C. It will become apparent to those skilled in the art that other suitable high speed devices may also be employed.

The silicon avalanche suppressor device 320 includes an input terminal 318A and an output terminal 318B. The input terminal 318A is connected to the switching circuit 332 via line 319 and to the high energy suppressor circuit 315 via line 319a. The output terminal 318B is connected to the neutral line conductor 312.

Considering now the operation of the transient suppressor 310, the operation of suppressor 310 is substantially similar to the operation of the transient suppressor 210 of FIG. 2. In this regard, the clamping circuit 315 comprise metal oxide varistor 317, together with its parallel connected varistor 317A. The varistors each have a voltage rating of 95 volts, which is substantially below the normal operating line voltage, such as 120 volts.

Accordingly, the metal oxide varistors 317 and 317A conduct current to a very low level, to the avalanche suppressor device 320, even during normal line voltage operation. Therefore, by using a varistor having a lower reverse bias voltage than the line voltage, the varistor enables transient line voltages to be clamped to a much lower level than could otherwise be achieved, by using a varistor with a reverse bias voltage being greater than the normal line voltage level. The low level conduction during normal operation is inconsequential.

When a high voltage transient voltage is initially applied to the high energy suppressor circuit 315, the voltage transient is instantly clamped as the suppressor circuit 315 is already conducting current. Therefore, the transient signal forces the suppressor circuit 315 into full conduction, so that the metal oxide varistors 317 and 317A, in cooperation with the avalanche suppressor 320, effectively limit or clamp the transient voltage to a safe voltage level, typically in the range of about 400 volts. The avalanche suppressor device 320 has a much lower reverse bias voltage than the metal oxide varistors. This bias voltage is typically in the range of 43 volts. Accordingly, the avalanche suppressor device 320 cooperates with the metal oxide varistors to clamp the initial surge of a transient signal.

The high voltage suppressor circuit 330, in spite of its fast response time, has limited current capability and thus has a tendency to be permanently damaged, when subjected to a high energy (e.g. high voltage and current) transient for any extended period of time.

Once the switch circuit variac 322 responds to the enablement signal generated by the trigger circuit 334, the clamping circuit 315 has responded to the initial portion of the transient signal, and is fully functional.

Thus, the circuit 315 clamps the transient signal to a substantial safe lower voltage level.

Therefore, when the switch circuit variac 322 starts conducting, the remaining portion of the transient surge is dissipated by only the high energy suppressor circuit 315, since the switch circuit 322 effectively short circuits the input terminal 318A of the high voltage suppressor device 330 to the neutral conductor 312.

In general, the arrangement 310 is similar to the arrangement 210 of FIG. 2. Additionally, the arrangement 310 is connected through a fuse 354 to a hot conductor 311. The connector 311 extends between a hot or positive input terminal 311A, through a circuit breaker 350, and a switch 352 to the conductor 311.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A transient suppression system for coupling a power line having three conductors to an electrical load sad three conductors include a neutral line conductor, a hot line conductor, and a ground line conductor, comprising:
   means defining a positive current flow path coupled to the individual ones of the three conductors of the power line;
   means defining a negative current flow path coupled to the individual ones of the three conductors of the power line;
   common clamping means coupled to said means defining a positive current flow path and to said means defining a negative current flow path and responsive to transient signals of any one of said conductors for dissipating the energy of the transient signal on any one of said conductors;
   said positive path including positive path positive poled unidirectional means for coupling a positive portion of said transient signal to said clamping mean and a pair of positive path negative poled unidirectional means for coupling said clamping means to the neutral and ground line conductors respectively of said power line; and
   said negative path including negative path negative poled unidirectional means for coupling a negative portion of said transient signal to said clamping mean and a pair of negative path positive poled unidirectional means for coupling said clamping means to the neutral and ground line conductors respectively of the power line, so that said common clamping means dissipates both the positive portion of said transient signals and the negative portion of said transient signals on any one of the conductors of said power line.

2. A system of suppressing electrical transient signals as recited in claim 1, wherein said positive path positive piled unidirectional means and said positive path negative poled unidirectional means each have a terminal coupled to said hot line conductor.

3. A system for suppressing electrical transient signal as recited in claim 2 wherein said positive path positive sled unidirectional means is a diode.

4. A system for suppressing electrical transient signals as recited in claim 2 wherein said positive path negative poled unidirectional means is a diode.

5. A system for suppressing electrical transient signals as recited in claim 1, wherein said clamping means comprises:
   means defining a pair of spaced leads for connection to said coupling means;
   first surge suppression means coupled between said spaced leads for suppressing a first portion of the transient signal; and
   second surge suppression means coupled between said spaced leads for suppressing a second portion of the transient signal.

6. A system for suppressing electrical transient signals as recited in claim 5, wherein said first surge suppression means includes a zener diode and shunt means, said zener diode and aid shunt means being connected in series across said positive and negative terminals.

7. A system for suppressing electrical transient signals as recited in claim 6, wherein said shunt means includes a resistor and a capacitor connected in parallel.

8. A system for suppressing electrical transient signals as recited in claim 5 wherein said second surge suppression means includes a varistor.

9. A system for suppressing electrical transient signals on a power line providing a line voltage, comprising:
   clamping means coupled to the power line for switching from a high impedance to a lower impedance at a certain switching voltage;
   said clamping mean being responsive to a transient signal on the power line for suppressing it continuously;
   initial dissipating means coupled to said clamping means for completing a first current dissipating path for said transient signal during an initial time period;
   said dissipating means cooperating with said clamping means to dissipate an initial portion of a transient signal for initial suppression purposes during said initial time period;
   switching means coupled to said dissipating means for completing a second current path including said clamping means and for diverting transient current flow away from said dissipating means following the initial time period for dissipating means protection purposes, and for permitting said clamping means to continue to suppress the transient signal to a low clamping voltage following the initial time period.

10. A system for suppressing electrical transient signals according to claim 9, wherein said switching means includes trigger means coupled to the power line, for enabling said switching means to switch between said second high impedance and said second low impedance following the initial time period.

11. A system for suppressing electrical transient signals on a power line, comprising:
   clamping means coupled to the power line for suppressing transient signals thereon and for switching between high and low impedances at a certain switching voltage;
   said clamping means substantially maintaining its high impedance during normal line voltage conditions and switching to its low impedance in response to an initial transient signal surge for clamping purposes;
   first path means having a first impedance for helping to suppress an initial transient signal surface to a high clamping voltage when said clamping means switches to its low impedance;
   second path means for inhibiting substantially said first path means from helping to suppress the transient signal following an initial transient signal surge and for permitting said clamping means to further suppress the transient signal to a lower clamping voltage following the initial transient signal surge, said high impedance being substantially an open circuit;
   said second path means including means for switching between a second impedance substantially lower than said fist impedance and a high impedance substantially higher than said first impedance; and
   said means for switching maintaining said higher impedance during normal voltage conditions and switching to said second impedance following an initial transient signal surge.

12. A system for suppressing electrical transient signals on a power line providing a line voltage, comprising:
   clamping means coupled to the power line or switching from a high impedance to a low impedance at a certain switching voltage;
   said clamping means being responsive to a transient signal on the power line for suppressing it;
   first blocking means having a first low impedance and a first high impedance, said blocking means for inhibiting said clamping means from switching to maintain said clamping means at its high impedance during normal line voltage, and for permitting said clamping means to switch to its low impedance for clamping purposes in response to an initial portion of a transient signal for initial suppression purposes during an initial time period; and
   second blocking means having a second blow impedance and a second high impedance, said second low impedance being substantially lower than said first low impedance, said second blocking means for inhibiting substantially said first blocking means from continuing to dissipate said transient signal following the initial time period for protection purposes, and for permitting said clamping means to suppress the transient signal to a low clamping voltage following the initial time period;
   wherein said second blocking means includes trigger means coupled to the power line, for enabling said second locking means to switch between said second high impedance and said second low impedance following the initial time period; and
   wherein said second blocking means further includes switching means response to said trigger means for switching between said second high impedance and said second low impedance and said second low impedance;
   said switching means maintaining its high impedance during normal line voltage conditions and switching to its low impedance for inhibiting purposes in response to said trigger means.

* * * * *